United States Patent
Empey

(10) Patent No.: US 8,465,236 B2
(45) Date of Patent: Jun. 18, 2013

(54) TIE-DOWN ASSEMBLY

(76) Inventor: David J. Empey, Rosemont (CA)

( * ) Notice: Subject to any disclaimer, the term of this patent is extended or adjusted under 35 U.S.C. 154(b) by 10 days.

(21) Appl. No.: 13/301,997

(22) Filed: Nov. 22, 2011

(65) Prior Publication Data

US 2012/0257942 A1 Oct. 11, 2012

(51) Int. Cl.
*B60P 3/06* (2006.01)

(52) U.S. Cl.
USPC ............................................................ 410/3

(58) Field of Classification Search
USPC ...................... 410/7–12, 19–21, 23, 100, 103
See application file for complete search history.

(56) References Cited

U.S. PATENT DOCUMENTS

| | | | | |
|---|---|---|---|---|
| 3,860,263 A * | 1/1975 | Taylor | | 410/12 |
| 5,180,262 A * | 1/1993 | Westerdale | | 410/12 |
| 5,314,275 A | 5/1994 | Cottrell et al. | | |
| 6,558,092 B1 * | 5/2003 | Woodruff | | 410/12 |
| 7,114,897 B1 * | 10/2006 | Boydstun et al. | | 410/19 |
| 7,360,978 B2 | 4/2008 | Howes | | |
| 7,484,917 B2 | 2/2009 | Howes | | |
| 7,682,114 B2 * | 3/2010 | Howes et al. | | 410/20 |
| 7,824,139 B2 * | 11/2010 | Howes et al. | | 410/20 |
| 7,871,228 B2 * | 1/2011 | Blanchet | | 410/20 |
| 8,061,941 B2 * | 11/2011 | Howes | | 410/20 |

* cited by examiner

*Primary Examiner* — H Gutman

(57) ABSTRACT

A tie-down assembly to be mounted in a deck portion to secure an object to the deck portion, including a frame and a pair of ratchet subassemblies. Each ratchet subassembly includes an elongate ratchet body to which a selected one of two straps is attachable, and a ratchet head secured to the ratchet body. Each of the ratchet bodies is mounted in the frame to permit rotation thereof in a predetermined rotary direction to tighten the selected one of the straps attached thereto, for securing the object to the deck portion. Each ratchet subassembly additionally includes a pawl, for preventing rotation of the ratchet head engageable therewith about the axis thereof in a direction opposite to the predetermined rotary direction. Each of the ratchet bodies is rotatable in the same predetermined rotary direction to tighten the selected one of the straps attached thereto respectively.

1 Claim, 13 Drawing Sheets

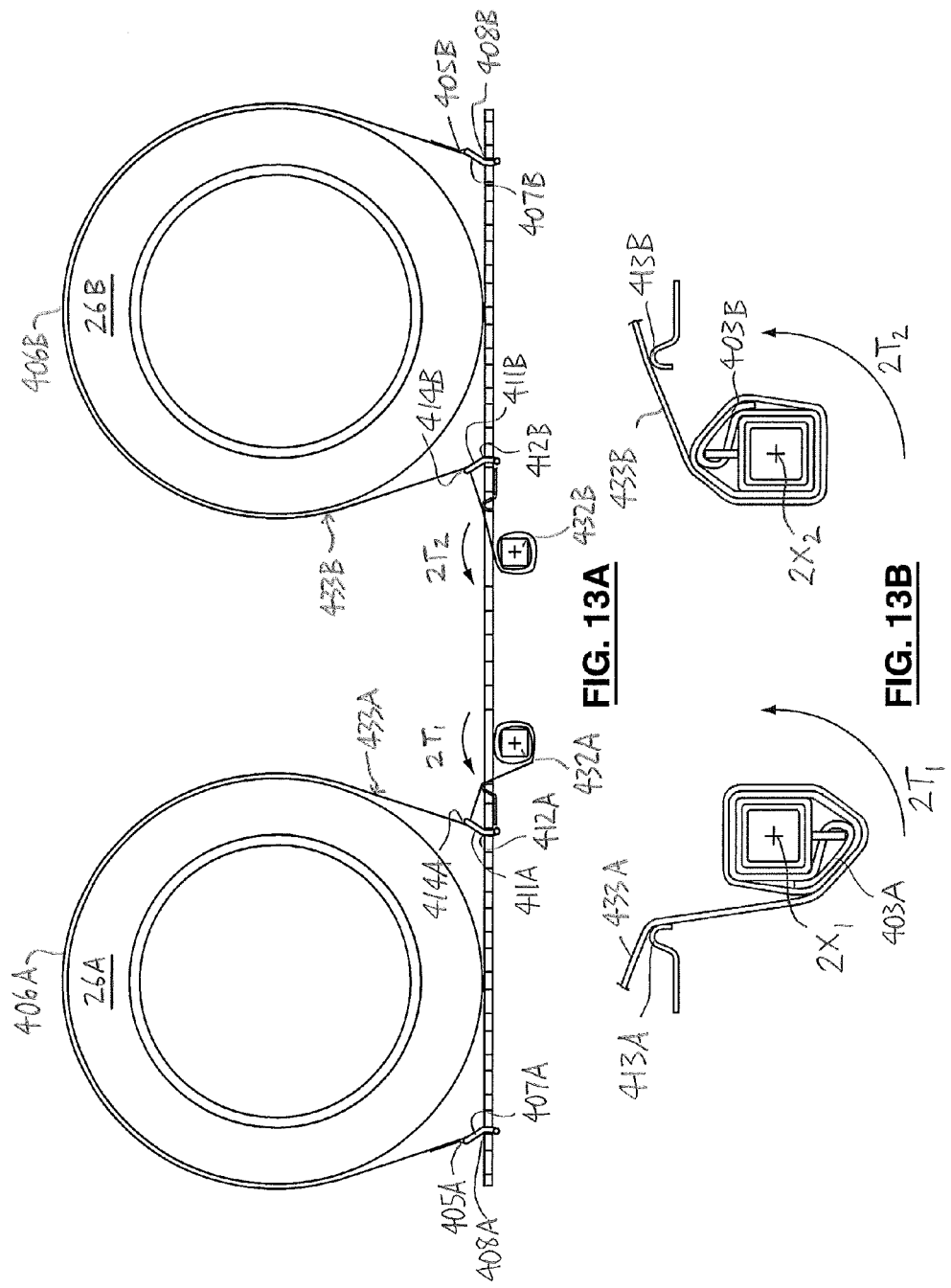

TIE-DOWN ASSEMBLY

FIELD OF THE INVENTION

The present invention relates to a tie-down assembly to be mounted in a deck portion, for tightening a strap to secure an object to the deck portion.

BACKGROUND OF THE INVENTION

As is well known in the art, vehicle transportation trailers (also referred to as autocarriers) typically include devices for tightening chains which are connected to frames of vehicles positioned on the trailers. The chains are tightened by the tightening devices in order to secure the vehicle to the trailer in each case.

More recently, straps are sometimes used to secure a vehicle to a trailer, instead of chains. The strap is positioned over a wheel on a vehicle, i.e., on top of the wheel, over the tread of the tire. Each wheel has a strap over it, and the straps are tightened to secure the vehicle to the trailer. A tie-down device is used to tighten the strap(s), and also to loosen the strap(s) when required. However, the existing tie-down devices have various defects or deficiencies. For instance, they tend to be somewhat difficult to use, where access to the tie-down device is restricted (i.e., due to structural elements of the trailer). This is because the prior art tie-down devices require rotation of certain elements in opposite directions for the same operation, i.e., tightening or loosening, as the case may be. However, this arrangement requires that the tie-down device be mounted on the trailer sufficiently spaced apart from the trailer's structural elements that an operator can operate the prior art tie-down device without restriction of the operator's movements by the structural elements. But because the structural elements are numerous, and the locations of the tie-down devices are primarily determined by the trailer's configuration and dimensions, in practice, it is difficult to position the tie-down devices in the proper locations and properly spaced apart from the structural elements. Often, because of the locations of the structural elements and the required locations of the tie-down devices, the prior art tie-down devices are positioned so closely to structural elements that safe operation of the tie-down devices is difficult, if not virtually impossible.

SUMMARY OF THE INVENTION

For the foregoing reasons, there is a need for an improved tie-down assembly which addresses or mitigates one or more of the defects or deficiencies of the prior art.

In its broad aspect, the invention provides a tie-down assembly to be mounted in a deck portion to secure an object to the deck portion. The tie-down assembly includes a frame and a pair of ratchet subassemblies. Each ratchet subassembly includes an elongate ratchet body to which a selected one of two straps is attachable, and a ratchet head secured to the ratchet body, the ratchet head and the ratchet body being coaxial relative to an axis thereof. Each of the ratchet bodies is mounted in the frame to permit rotation thereof about the axis thereof respectively in a predetermined rotary direction to tighten the selected one of the straps attached thereto, for securing the object to the deck portion. Each ratchet subassembly additionally includes a pawl, for preventing rotation of the ratchet head engageable therewith about the axis thereof in a direction opposite to the predetermined rotary direction. Each of the ratchet bodies is rotatable in the same predetermined rotary direction to tighten the selected one of the straps attached thereto respectively.

In another aspect, in each ratchet subassembly, the pawl is movable between an engaged position, in which the pawl engages the ratchet head to prevent rotation thereof in the direction opposite to the predetermined rotary direction, and in which the pawl permits rotation of the ratchet head in the predetermined rotary direction, and a disengaged position, in which the pawl is disengaged from the ratchet head to permit rotation thereof in the direction opposite to the predetermined rotary direction, for loosening the selected one of the straps attached to the ratchet body to which the ratchet head is secured.

In another aspect, the pawl is movable from the engaged position to the disengaged position by engaging an engagement portion of the pawl with a bar positioned between the engagement portion and a locating part of the tie-down assembly, to lever the pawl to the disengaged position.

In another of its aspects, the invention provides a method of securing two wheels of a vehicle to a deck portion. The method includes the steps of providing two straps, each strap extending between first and second ends thereof and includes an intermediate portion therebetween, and providing a tie-down assembly. The tie-down assembly is mounted in the deck portion. The first end of each of the straps is attached to each ratchet body respectively. Next, the respective intermediate portions of each strap are positioned on respective selected ones of the wheels. The second end of each strap is attached to the deck portion at a distal preselected location thereon selected to locate the intermediate portions of each strap on each wheel. Each ratchet body is rotated in a predetermined rotary direction to tighten the straps respectively, for securing the respective wheels to the deck portion.

In another aspect, the method additionally includes the step of moving each pawl to the disengaged position to permit the ratchet body in the ratchet subassembly thereof to rotate in a direction opposite to the predetermined direction, for loosening the strap attached to the ratchet body thereof to permit removal thereof from the selected wheel therefor.

BRIEF DESCRIPTION OF THE DRAWINGS

The invention will be better understood with reference to the attached drawings, in which:

FIG. 13A is a schematic illustration of the tie-down assembly of FIG. 11 with straps attached thereto securing wheels to the deck portion, drawn at a larger scale;

FIG. 13B is a schematic illustration of ratchet bodies of FIG. 13A with straps attached thereto, drawn at a larger scale;

DETAILED DESCRIPTION

Figure 4:
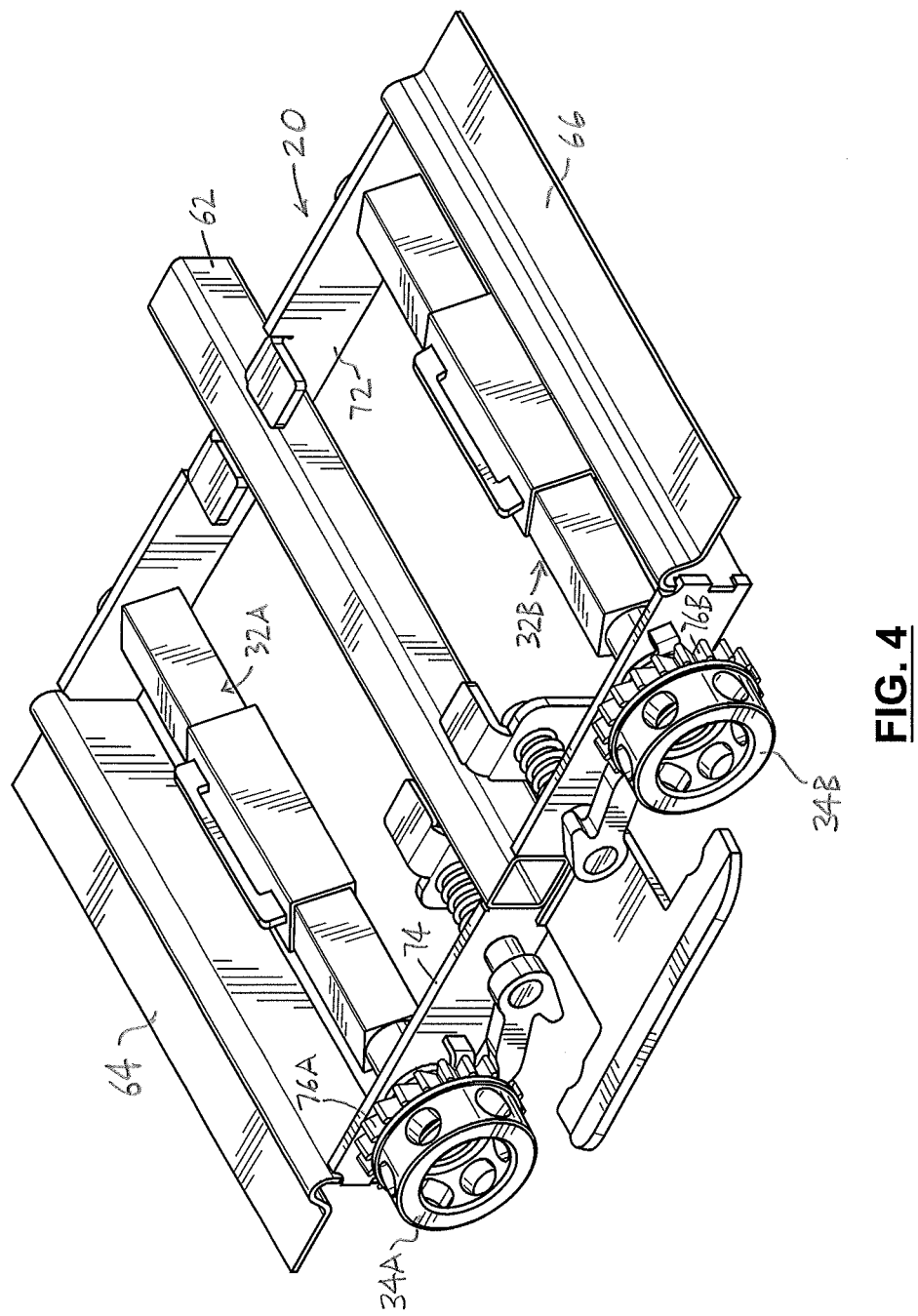
FIG. 4 is an isometric view of an embodiment of a tie-down assembly of the invention, drawn at a smaller scale.
Figure 5A:
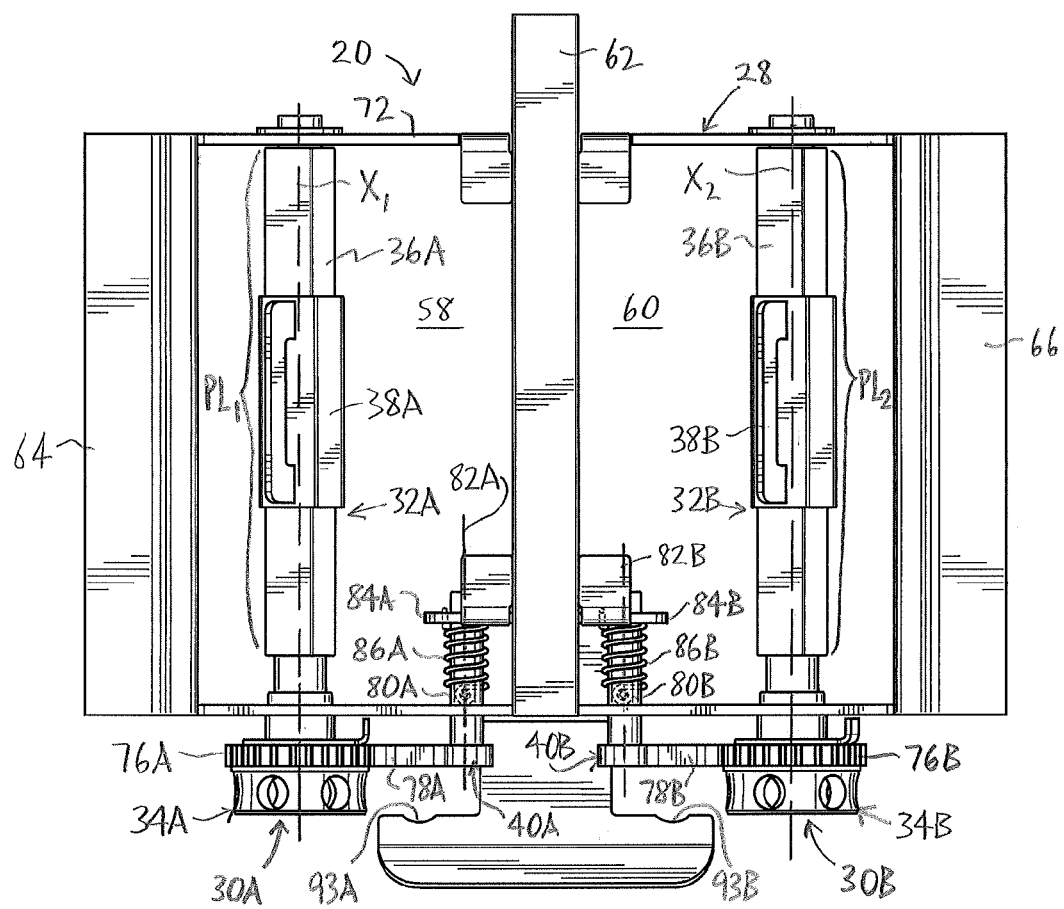
FIG. 5A is a top view of the tie-down assembly of FIG. 4 in which both pawls are in engaged positions.

In the attached drawings, like reference numerals designate corresponding elements throughout. Reference is made to FIGS. 1-10 to describe an embodiment of a tie-down assembly of the invention referred to generally by the numeral 20. The tie-down assembly 20 is to be mounted in a deck portion 22 (FIG. 2) to secure an object 26 (e.g., a wheel) to the deck 22. In one embodiment, the tie-down assembly 20 includes a frame 28 and a pair of ratchet subassemblies 30A, 30B (FIGS. 4, 5A). Each ratchet subassembly 30A, 30B preferably includes an elongate ratchet body 32A, 32B to which a selected one of two straps 33A, 33B is attachable, and a ratchet head 34A, 34B secured to the ratchet body 32A, 32B, the ratchet head 34A, 34B and the ratchet body 32A, 32B being coaxial relative to respective axes $X_1$, $X_2$ thereof (FIG. 5A). Preferably, each of the ratchet bodies 32A, 32B is mounted in the frame 28 to permit rotation thereof respectively in a predetermined rotary direction to tighten the selected one of the straps 33A, 33B respectively attached thereto, for securing the object 26 to the deck portion 22. It is also preferred that each ratchet subassembly 30A, 30B includes a pawl 40A, 40B, for preventing rotation of the ratchet head 34A, 34B engageable therewith about the axes $X_1$, $X_2$ thereof in a direction opposite to the predetermined rotary direction. Preferably, each of the ratchet bodies 32A, 32B is rotatable in the same predetermined rotary direction to tighten the selected one of the straps 33A, 33B attached thereto respectively, as will be described.

Figure 7:
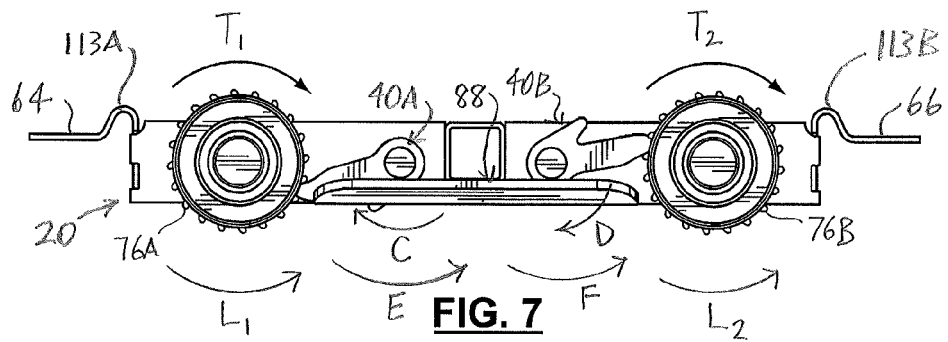
FIG. 7 is a front view of the tie-down assembly of FIG. 4.
Figure 8:
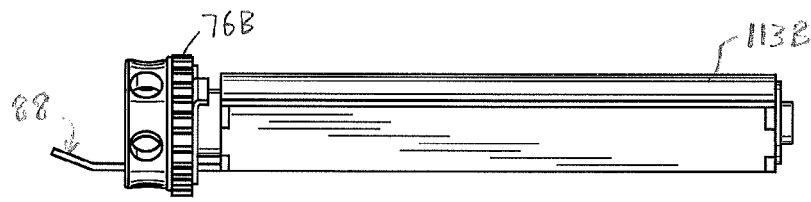
FIG. 8 is a side view of the tie-down assembly of FIG. 7.
Figure 9:
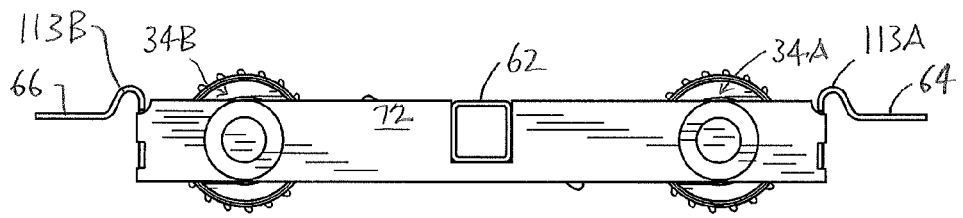
FIG. 9 is a back view of the tie-down assembly of FIG. 8.
Figure 10:
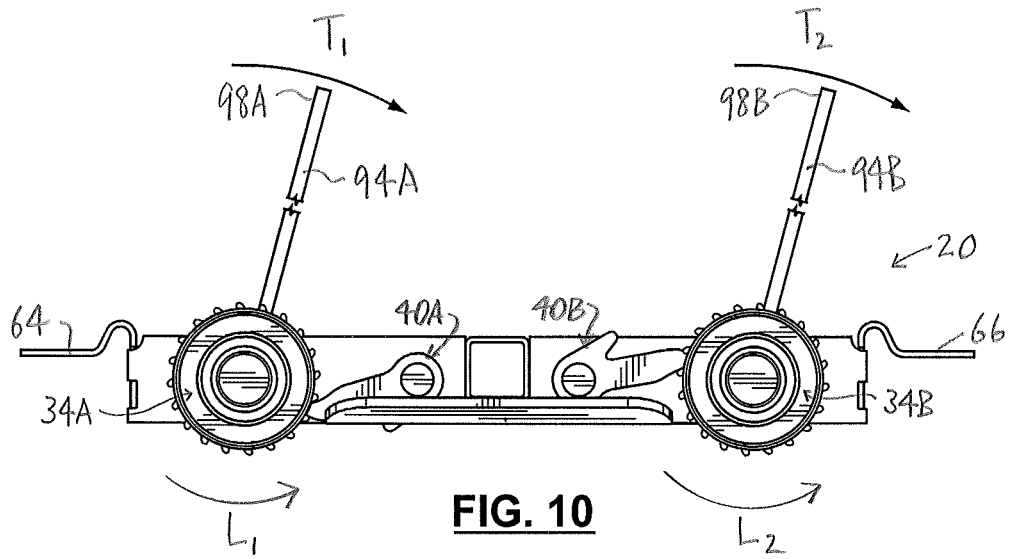
FIG. 10 is a front view of the tie-down assembly of FIG. 8, showing positions of bars engaged in ratchet heads respectively, for tightening the straps.

The predetermined rotary direction is also referred to herein as the "tightening direction". The direction opposite thereto is also referred to herein as the "loosening direction". The tightening direction for one embodiment of the tie-down assembly 20 is schematically represented by arrows $T_1$ and $T_2$ in FIGS. 7 and 10, and the loosening direction is schematically represented by arrows $L_1$ and $L_2$ in FIGS. 7 and 10. As can be seen in FIGS. 7 and 10, for the tie-down assembly 20 illustrated therein, the tightening direction is clockwise when the ratchet body is viewed from the ratchet head secured thereto.

As shown in FIGS. 4 and 5A, in one embodiment, each ratchet body 32A, 32B preferably includes a ratchet axle 36A, 36B and a collar 38A, 38B positioned on the ratchet axle 36A, 36B for rotation with the ratchet axle 36A, 36B. Preferably, the straps 33A, 33B are respectively attachable to the collars 38A, 38B, in any suitable manner. As will be described, each of the collars 38A, 38B preferably is positionable in a selected one of a number of positions along predetermined lengths "$PL_1$", "$PL_2$" (FIG. 5A) of the ratchet axles 36A, 36B respectively. This enables an operator (not shown) to position the collar 38A, 38B in a location so that the strap attached to the collar is substantially aligned with the wheel on which the strap is to be positioned. In this way, the position of the strap is adjustable so that it is substantially alignable with the wheel, to take into account virtually any positioning of the wheels on the deck portion.

Figure 1:
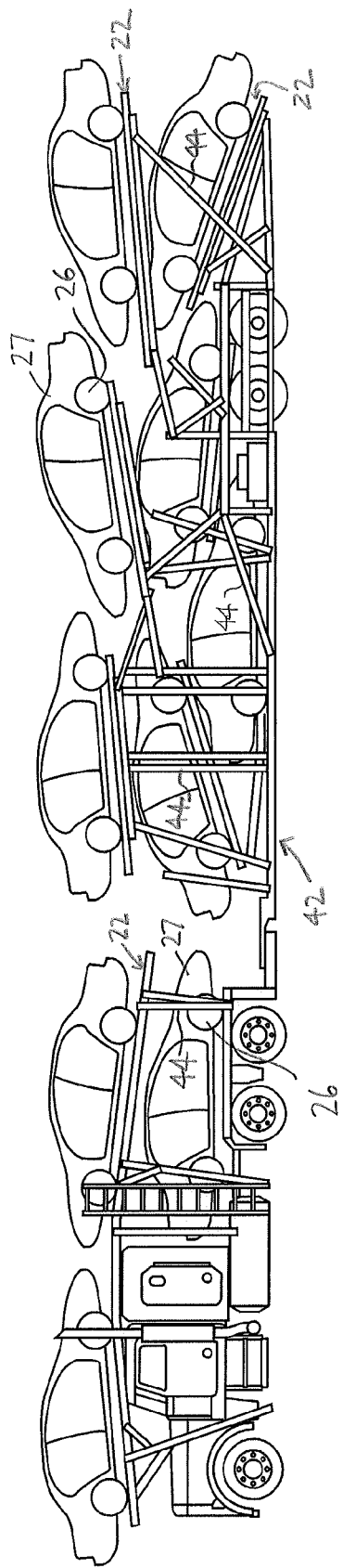
FIG. 1 is a side view of a vehicle transportation trailer with a number of vehicles positioned thereon.

As can be seen in FIG. 1, it is preferred that the deck portions 22 are included in a vehicle transportation trailer 42 to which vehicles 27 are secured. The trailer 42 preferably has deck portions at different levels and, when the trailer is loaded, the deck portions are located in preselected positions relative to each other, as is known in the art. The trailer 42 includes a number of uprights 44 that are structural elements, e.g., at least some of the uprights 44 support deck portions 22 to support the deck portions 22 (FIG. 1). (It will be understood that the uprights 44 are not necessarily positioned vertically, or substantially vertically.)

Those skilled in the art will appreciate that the tie-down assembly 20 may be mounted (i.e., retrofit) in existing vehicle transportation trailers, i.e., in trailers which are equipped with the prior art devices for tightening chains. For instance, in FIG. 2, the deck portion 22 illustrated is in a trailer which includes the prior art devices 46 for tightening chains.

Figure 2:
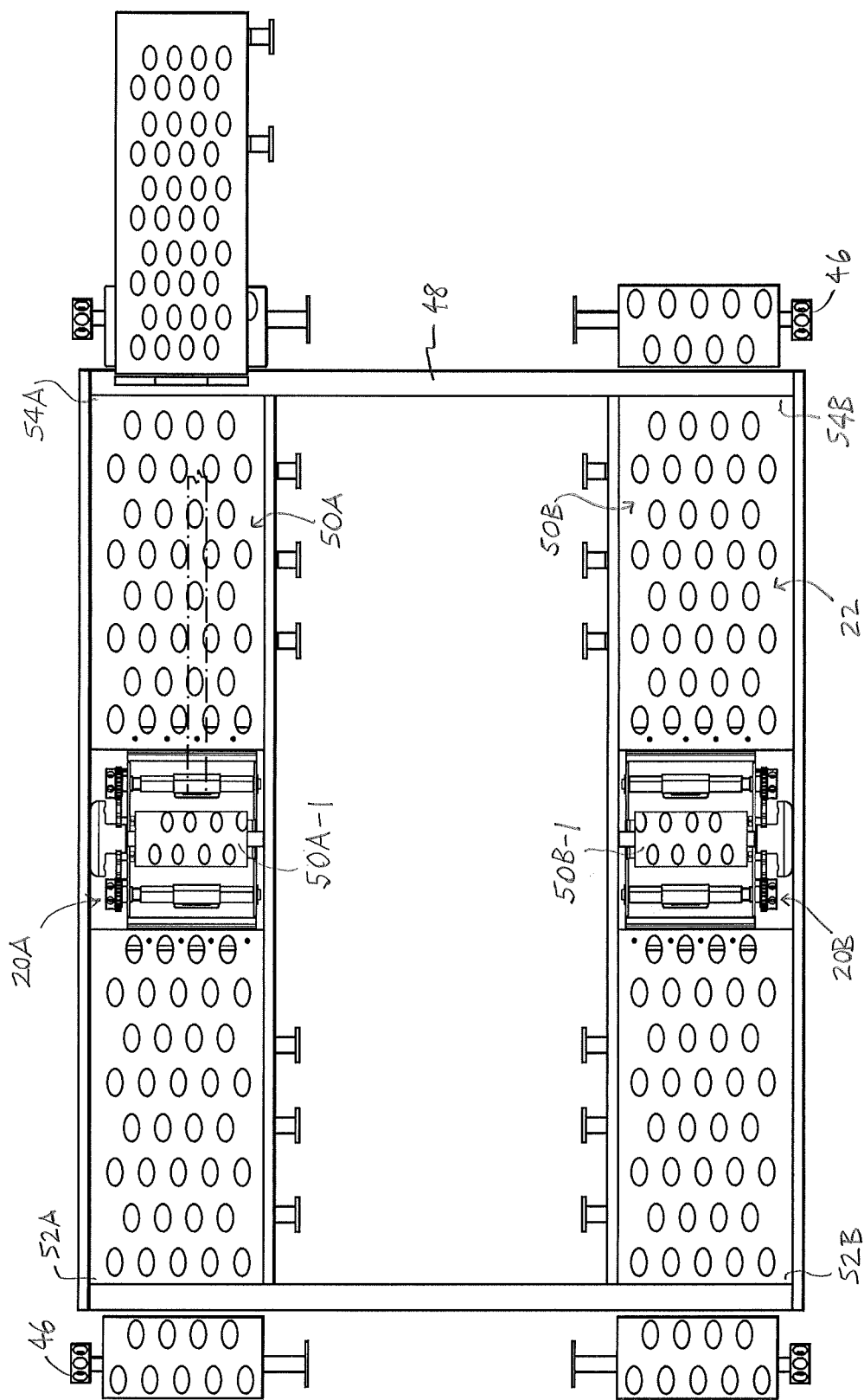
FIG. 2 is a top view of a portion of an embodiment of a trailer of the invention, drawn at a larger scale.

As can be seen in FIG. 2, the deck portion 22 typically includes a trailer frame portion 48 and decking 50A, 50B attached to the trailer frame portion 48. The decking 50A, 50B extends between front and back ends 52A, 52B, and 54A, 54B thereof respectively. Preferably, to retrofit the tie-down assembly 20, a hole is cut in the decking 50A, 50B approximately midway between the ends (52A, 54A, and 52B and 54B respectively). The tie-down assembly 20 is then positioned in the hole and attached to the decking and the trailer frame portion in any suitable manner, as would be known to those skilled in the art. For clarity of illustration, the tie-down assemblies shown in FIG. 2 are identified as 20A and 20B respectively. As can be seen in FIG. 2, in one embodiment, it is preferred that respective elements 50A-1, 50B-1 of the decking 50A, 50B are positioned on the tie-down assembly 20 to enable wheels of the vehicle to pass over the tie-down assembly 20, when the vehicle 27 is moved onto, and taken off, the trailer 42.

Those skilled in the art will appreciate that the tie-down assembly 20 may also be included in the vehicle transportation trailer 42 when it is manufactured. Those skilled in the art will appreciate that, regardless of whether the tie-down assembly 20 is retrofit, the frame 28 preferably is secured to the frame portion 48 of the trailer 42, using any suitable means. Preferably, the frame 28 is welded to the frame portion 48 of the trailer.

As shown in FIG. 5A, in one embodiment, the frame 28 of the tie-down assembly 20 preferably defines a substantially rectangular space therein which is divided into two compartments 58, 60 by a central member 62. The tie-down assembly 20 preferably also includes mounting plates 64, 66, which are used to secure the tie-down assembly 20 to the decking. Preferably, when the tie-down assembly 20 is positioned in the hole cut in the decking, the mounting plates 64, 66 (FIG. 3) are positioned underneath the parts of the decking immediately adjacent to the hole, and secured thereto by any suitable fastening means (not shown) (e.g., welding). Also, the central member 62 preferably is secured to the trailer frame portion 48 (e.g., by welding, or by any other suitable means), to secure the tie-down assembly to the frame portion 48.

Figure 6:
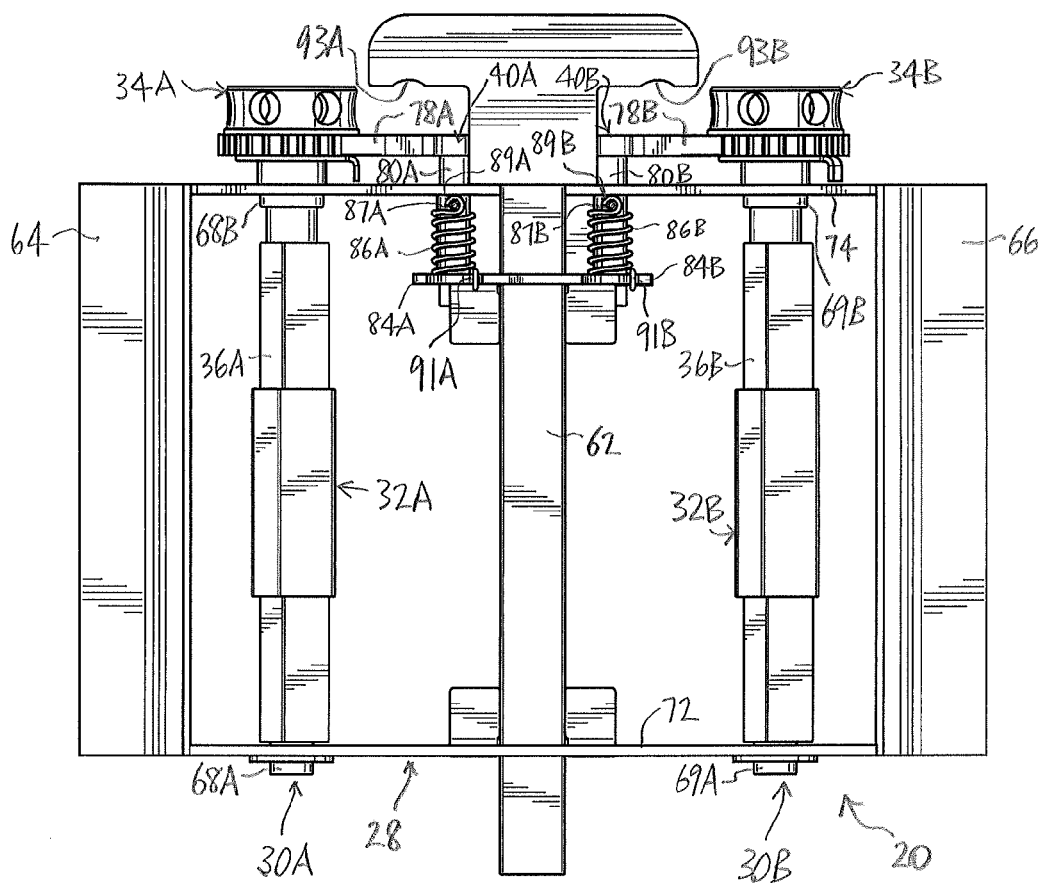
FIG. 6 is a bottom view of the tie-down assembly of FIG. 4.

Preferably, the ratchet subassemblies 30A, 30B preferably are mounted in the frame 28 so that the ratchet axles 36A, 36B are substantially positioned in the compartments 58, 60 respectively (FIG. 5A). Each ratchet axle 36A, 36B extends between inner and outer ends 68A, 68B and 69A, 69B respectively (FIG. 6). The inner and outer ends 68A, 68B and 69A, 69B are journalled in inner and outer sides 72, 74 of the frame 28 respectively, so that the ratchet bodies 32A, 32B are rotatable about the respective axes $X_1$, $X_2$ thereof. The ratchet heads 34A, 34B preferably are fixedly mounted (i.e., secured) on the ratchet bodies 32A, 32B respectively at the outer ends 68B, 69B (FIG. 6).

Preferably, the ratchet heads 32A, 32B include teeth 76A, 76B (FIG. 4), which are engageable by the pawls 40A, 40B respectively. When the pawls 40A, 40B are in the engaged positions thereof, they are engaged with the teeth 76A, 76B respectively (as shown in FIG. 5A), and the ratchet heads 34A, 34B are not rotatable in the loosening direction. Accordingly, when the pawls 40A, 40B are in the engaged position, the ratchet bodies 32A, 32B are prevented from rotating in the loosening direction by the pawls 40A, 40B. However, when the pawls 40A, 40B are in the engaged positions, the ratchet bodies 32A, 32B are rotatable in the tightening direction.

For clarity, only one ratchet subassembly, 30B, will be described in detail herein, it being understood that in almost all material aspects, the ratchet subassemblies 30A, 30B are substantially the same, being virtual mirror images of each other. (The sole material difference is the orientation of engagement portions 78A, 78B of the pawls 40A, 40B relative to the ratchet heads 34A, 34B respectively, as described below.) The pawl 40B preferably includes the engagement portion 78B (FIG. 5A) adapted for engagement with the teeth 76B, as is known in the art. Preferably, and as can be seen in FIG. 5A, the pawl 40B includes a rod 80B rotatable about an axis 82B thereof, and the engagement portion 78B is fixedly mounted on the rod 80B. In one embodiment, the rod 80B extends generally between a support plate 84B and the engagement portion 78B, and is mounted in the support plate 84B and in the outer side 74 of the frame 28 for rotation about the axis 82B. The rod 80B is also adapted for axial movement thereof (i.e., movement of the rod 80B in the directions parallel to the axis 82B, indicated by arrows A and B in FIG. 5B) relative to the support plate 84B and the outer side 74 of the frame 28. Preferably, a compression spring 86B (i.e., a spring that stores energy when compressed) connects the rod 80B and the support plate 84B, to urge the pawl 40B to the engaged position (FIG. 5A). (As will be described, each of the springs preferably also functions as a torsion spring.) It can be seen, therefore, that the compression spring 86B biases the pawl 40B to the engaged position.

As can be seen in FIG. 7, both of the pawls 40A, 40B are positioned and configured for engagement with the teeth 76A, 76B, when the pawls 40A, 40B are in the engaged positions thereof. From the foregoing description, it will be appreciated that the springs 86A, 86B bias the pawls 40A, 40B to the respective engaged positions therefor, first, by urging both of the pawls 40A, 40B to move linearly in the direction indicated by arrow B in FIG. 5A. However, the springs 86A, 86B also act upon the pawls 40A, 40B in a second way, namely, by respectively urging the pawls 40A, 40B to rotate about their respective axes 82A, 82B in the clockwise direction, as indicated by arrows "C" and "D" in FIG. 7. Preferably, the pawls 40A, 40B are both urged to rotate in the clockwise direction about the axes 82A, 82B respectively by the springs 86A, 86B (FIG. 5A).

As can also be seen in FIG. 7, it is preferred that the pawl 40A is "inverted", i.e., when in the engaged position, the engagement portion 78A engages the ratchet head 34A in a lower quadrant thereof. (In contrast, the engagement portion 78B of the pawl 40B engages the ratchet head 34B in a "normal" position, i.e., in an upper quadrant thereof) Therefore, due to gravity, the pawl 40A is influenced to pull away from the ratchet head 34A (i.e., pivot downwardly), in the absence of the urging provided by the spring 86A. Such urging causes the pawl 40A to pivot about the axis 82A in the direction indicated by arrow C in FIG. 7. It can be seen, therefore, that the springs 86A, 86B act upon each of the pawls 40A, 40B respectively in two different ways, i.e., by urging linear motion (i.e., in the direction indicated by arrow B), and also (and simultaneously) by urging rotational motion (i.e., as indicated by arrows C and D).

The springs 86A, 86B are attached to both the support plates 84A, 84B respectively, and the rods 80A, 80B respectively. The springs 86A, 86B preferably are made of any suitable material, e.g., spring steel. As will be described, where the springs are coil springs, one end of each spring is secured to the support plate, and the other end of the spring is secured to the rod. It will be appreciated by those skilled in the art that various types of springs may be used, and that various arrangements may be used to secure the springs to the rod and (via the support plate) to the frame. As can be seen in FIG. 6, pins 87A, 87B preferably are positioned on the rods 80A, 80B respectively so that the pins 87A, 87B are distal to the support plates 84A, 84B. The pins 87A, 87B preferably are secured to the rods 80A, 80B in any suitable manner, as would be known to those skilled in the art. Referring to the spring 86A, it can be seen in FIG. 6 that an outer end 89A of the spring 86A is secured to the pin 87A, and also that an inner end 91A of the spring 86A is secured to the support plate 84A.

Preferably, the inner end 91A is secured to the support plate 84A in any suitable manner, as would be known to those skilled in the art. For instance, in one embodiment, the inner end 91A preferably is positioned in a notch in the support plate 84A. It is also preferred that the end portion is positioned in the notch so that it holds itself in the notch, because the end 91A is twisted (or deflected) to position it in the notch.

As can be seen in FIG. 6, the spring 86B preferably extends between an outer end 89B and an inner end 91B. It is also preferred that the outer end 89B is secured to the pin 87B, and the inner end 91B is secured to the support plate 84B. Because the springs 86A, 86B are secured to the support plates 84A, 84B at each of the inner ends 91A, 91B thereof respectively, and to the rods 80A, 80B at each of the outer ends 89A, 89B respectively, the springs 86A, 86B simultaneously urge each of the pawls 40A, 40B to move in two ways (i.e., linearly, and rotationally), as will be described.

Figure 5B:
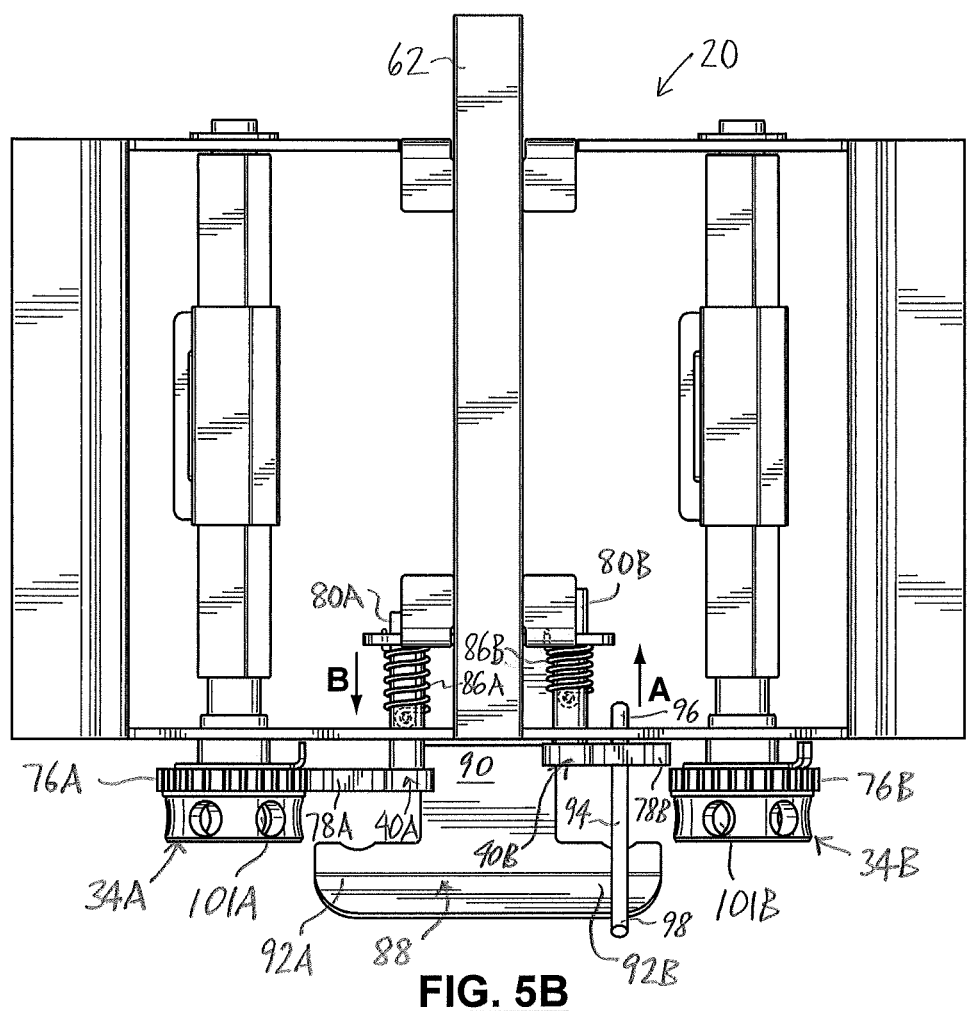
FIG. 5B is a top view of the tie-down assembly of FIG. 5A in which one of the pawls is in a disengaged position.

The pawl 40B is shown in the disengaged position in FIG. 5B. However, the pawl 40A is shown in the engaged position in FIG. 5B. To simplify the drawings, in both FIGS. 5A and 5B, the pawl 40A is shown in the engaged position. However, from the description herein, it will be understood that the pawl 40A is movable between the engaged and the disengaged positions.

In summary, in each ratchet subassembly 30A, 30B, the pawl 40A, 40B is movable between the engaged position and the disengaged position. Each of the pawls 40A, 40B is also urged to rotate clockwise about its axis by springs 86A, 86B, so that the pawls 40A, 40B are engaged with the teeth 76A, 76B, when the pawls 40A, 40B are in the engaged position. When in the engaged position, the pawl 40A, 40B engages the ratchet head 34A, 34B to prevent rotation thereof in the direction opposite to the predetermined rotary direction, and in which the pawl 40A, 40B permits rotation of the ratchet head in the predetermined rotary direction. When in the disengaged position, the pawl 40A, 40B is disengaged from the ratchet head 34A, 34B to permit rotation thereof in the direction opposite to the predetermined rotary direction, for loosening the selected one of the straps 33A, 33B attached to the ratchet body 32A, 32B to which the ratchet head 34A, 34B is secured. As noted above, the pawl 40A, 40B preferably is biased to the engaged position.

In one embodiment, the frame 28 preferably also includes a base plate 88 mounted to the outer side 74 (FIG. 5B). Preferably, the base plate 88 includes a central portion 90 and locating parts 92A, 92B extending from the central portion 90 in opposite directions generally parallel to the engagement portions 78A, 78B of the pawls 40A, 40B (FIG. 5B). The locating parts 92A, 92B preferably are spaced apart from the engagement portions 78A, 78B respectively. Preferably, the locating parts 92A, 92B include bights or slots 93A, 93B (FIGS. 5A, 6).

As can be seen in FIGS. 5A and 5B, to move the pawl 40B from the engaged position (FIG. 5A) to the disengaged position (FIG. 5B), a bar 94 preferably is partially inserted between the engagement portion 78B and the locating part 92B. A lower end 96 of the bar 94 preferably is positioned below the engagement portion 78B, with an upper end 98 of the bar extending upwardly and away from the engagement portion 78B. Preferably, the bar 94 engages the locating part 92B at the slot 93B, which locates the bar 94 relative to the engagement portion 78B. It can be seen in FIG. 5B that the locating part 92B preferably is used as a fulcrum, and the bar 94 is used as a lever to pry the pawl 40B inwardly, i.e., in the direction indicated by arrow A in FIG. 5B. While engaging the engagement portion 78B, the bar 94 is pushed against the engagement portion 78B (i.e., when the upper end 98 is subjected to downwardly and outwardly directed pressure) to overcome the resistance of the spring 86B and, as a result, to move the engagement portion 78B from the engaged position (FIG. 5A) to the disengaged position thereof (FIG. 5B).

In summary, it is preferred that each of the pawls 40A, 40B is movable from the engaged position to the disengaged position by engaging the engagement portion 78A, 78B of the pawls 40A, 40B with the bar 94 positioned between the engagement portion 78A, 78B and the locating part 92A, 92B to lever or pry the pawl 40A, 40B to the disengaged position.

The support plates 84A, 84B are secured to the frame 28. The rods 80A, 80B are rotatable about the axes 82A, 82B, and they are also linearly or axially movable (i.e., in the directions indicated by arrows "A" and "B" in FIG. 5B), relative to the support plates 84A, 84B, and therefore also relative to the frame 28. From the foregoing, it can be seen that the inner end of each spring, being secured to the support plate, is stationary relative to the frame, and the outer end of each spring, being secured to the rod, is rotationally and linearly movable relative to the frame. Accordingly, when the rod is moved inwardly (i.e., in the direction indicated by arrow "A"), the pin is also moved inwardly, and an axial load is applied to the spring, shortening the spring, and storing potential energy in it. As described above, the axial movement occurs when the operator pries the pawl inwardly, using the bar 94. Because of this, once the load (i.e., transmitted via the bar 94) is removed, the spring extends axially, returning the pawl to the engaged position.

It will be appreciated by those skilled in the art that, when the operator pries the engaged portion of the pawl from the engaged position to the disengaged position, the engaged portion is also pivoted away from engagement with the teeth on the ratchet head. In FIG. 7, it can be seen that when the pawl 40A is moved from the engaged position to the disengaged position, the engaged portion 78A is pivoted downwardly, i.e., in the direction indicated by arrow "E" in FIG. 7. This occurs due to the operator using the bar 94 (not shown in FIG. 7) to press the engagement portion 78A rotationally downwardly when the operator also uses the bar to push the engagement portion 78A (and thus also the rod 80A) axially inwardly, thereby moving the engagement portion 78A to the disengaged position.

In the same way, when the operator engages the bar 94 with the engagement portion 78B to move it from the engagement position to the disengaged position, the operator (via the bar 94) causes the engagement portion 78B to move both linearly or axially (as indicated by arrow "A" in FIG. 5B) and rotationally (as indicated by arrow "F" in FIG. 7). Because the engagement portion 78B is secured to the rod 80B, this results in simultaneous linear (i.e., axial) inward movement of the rod 80B, and rotation of the rod 80B.

In each case, the rotation of the rod when the operator pries with the bar 94 causes rotation of the pin in the same direction, applying another load to the spring, i.e., a torque or a twisting force, rotating the inner end of the spring through an angle relative to the axis (as indicated by arrows "E" and "F" in FIG. 7) as the torsional force is applied. When the axial and torsional forces are removed (i.e., when the pressure exerted by the operator via the bar 94 is removed), the spring moves axially (i.e., in the direction indicated by arrow "B") and rotationally (i.e., in the directions indicated by arrows "C" and "D") to move the engagement portions to their respective engaged positions.

In one embodiment, each ratchet head 34A, 34B preferably includes apertures 101A, 101B (FIGS. 5A, 5B) in which an end (not shown) of the bar 94 is receivable. The apertures 101A, 101B are to facilitate tightening the straps 33A, 33B, i.e., to facilitate rotating the ratchet head 34A, 34B in the tightening direction. Bars (identified in FIG. 10 as 94A and 94B for convenience) are positioned partially in the apertures 101A, 101B, to enable the operator to tighten the straps 33A, 33B. (It will be understood that, in practice, the operator would use only one bar at a time, and tighten each strap serially.) For example, as can be seen in FIG. 10, to turn the ratchet head 34B in the tightening direction, the bar's end is positioned in a selected one of the apertures 101B, and the operator (not shown) moves the bar 94 in the tightening direction, thereby causing the ratchet head 34B to turn in the tightening direction, to tighten the strap connected to the collar 38B. Similarly, and as shown in FIG. 10, the bar 94 is inserted into a selected one of the apertures 101A in the ratchet head 34A, and the bar 94 is moved in the tightening direction (indicated by arrow $T_1$), to tighten the straps 33A. The same process is followed, with the end of the bar 94 positioned in one of the holes 401B as desired, to tighten the strap 33B.

Figure 3A:
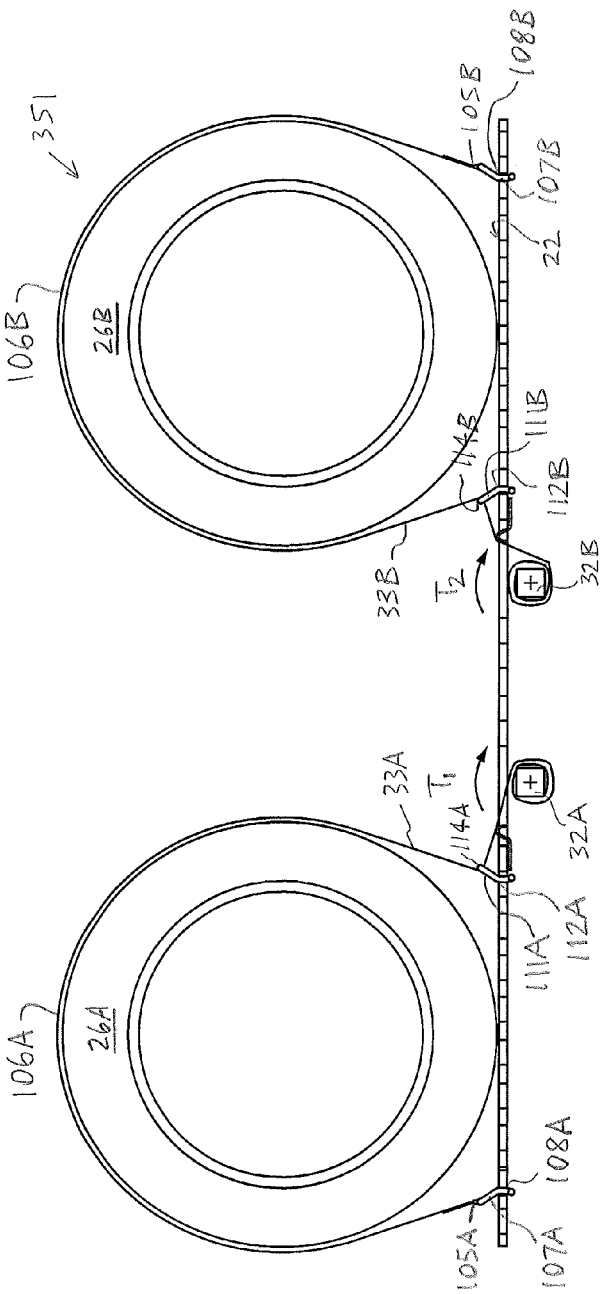
FIG. 3A is a schematic illustration of the tie-down assembly of FIG. 2 with straps attached thereto securing wheels to a deck portion of the trailer, drawn at a larger scale.

It will be appreciated that, in normal operation, two straps preferably are attached to the tie-down assembly, i.e., the straps extending outwardly from the tie-down assembly 20 in opposite directions, as can be seen in FIG. 3A. In the following description, where reference is made to the strap 33B alone, it will be understood that the strap 33A is the same in all material respects.

Figure 3B:
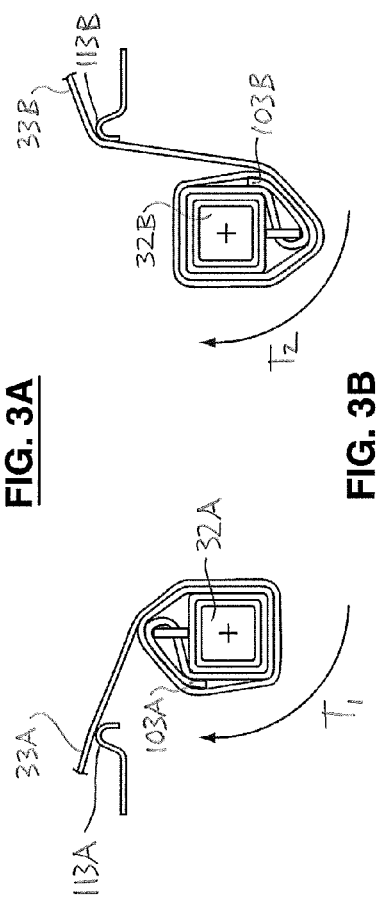
FIG. 3B is a schematic illustration of ratchet bodies of FIG. 3A with straps attached thereto, drawn at a larger scale.

As can be seen in FIGS. 3A and 3B, the strap 33B preferably extends between a first end 103B which is secured to the collar 38B, and a second end 105B. It is also preferred that the straps 33A, 33B include intermediate portions 106A, 106B positioned between the respective first ends 103A, 103B and second ends 105A, 105B. When the strap 33B is to be tightened, the second end 105B preferably is secured to the deck portion 22 via any suitable first connector 107B, e.g., a J-hook or double wire hook. Preferably, each first connector 107A, 107B is for connecting each second end 105A, 105B of each strap 33A, 33B respectively to the deck portion 22 at distal preselected locations 108A, 108B respectively on the deck portion 22 to locate at least parts of the intermediate portions 106A, 106B of each strap on each object 26 respectively (FIG. 3A). In effect, when the second ends 105A, 105B are connected to the deck portion 22 by the first connectors 107A, 107B respectively, the second ends 105A, 105B are attached to the deck portion 22.

The first end 103B preferably is secured to the collar 38B via any suitable means. For instance, the collar 38B preferably includes a slot 109B therein (FIG. 5B) in which the first end 103B of the strap 33B is receivable, and securable. For example, the first end 103B and an adjacent portion of the strap 33B may be passed through the slot 109B and subsequently wrapped onto itself when the ratchet body 34B rotates, to secure the first end to the collar (FIG. 3B). Other means for securing the first end 103B of the strap 33B to the collar 38B (i.e., to the ratchet body 34B) will occur to those skilled in the art.

Preferably, the tie-down assembly 20 is made of any suitable material, e.g., many of its components are made of a suitable steel.

It is also preferred that the ratchet bodies 32A, 32B include ratchet axles 36A, 36B respectively which are, in one embodiment, substantially square in cross-section. As described above, the collars 38A, 38B preferably are movable axially (i.e., in a direction substantially parallel to the axes thereof) on the ratchet axles 36A, 36B between the inner and outer sides 72, 74, i.e., along predetermined lengths $PL_1$, $PL_2$ of the ratchet axles 36A, 36B (FIG. 5A). Preferably, the collars 38A, 38B are positionable on the ratchet axles 36A, 36B respectively as required, e.g., for aligning straps with the wheels 26 on which the straps 33A, 33B are located.

As can be seen in FIG. 3A, preferably, the second end 105A, 105B of each strap 33A, 33B is connected to the deck portion 22 by the first connector 107A, 107B. It will be understood that a number of elements are omitted from FIGS. 3A and 3B to simplify the drawings, and also some elements in FIGS. 3A and 3B are disproportionate or exaggerated, for illustrative purposes. For instance, as illustrated in FIG. 3A, the straps 33A, 33B are tightened, i.e., securing the wheels 26A, 26B to the deck portion 22. The vehicle is omitted from FIG. 3A for clarity of illustration. Although the intermediate portions 106A, 106B of the straps 33A, 33B are shown in FIG. 3A as not engaging the wheels 26A, 26B for clarity of illustration, it will be understood that the intermediate portions 106A, 106B do engage the wheels 26A, 26B when the straps 33A, 33B are tightened, to secure the wheels 26A, 26B to the deck portion 22.

As can be seen in FIG. 3B, the first ends 103A, 103B of the straps 33A, 33B preferably are attached to the ratchet bodies 32A, 32B respectively. It will be understood that the ratchet bodies 32A, 32B are both rotated counter-clockwise when the second ends 105A, 105B of the straps 33A, 33B are pulled out, i.e., when preparing to secure a new vehicle to the trailer. The second ends 105A, 105B are pulled out until they are at the distal preselected locations 108A, 108B therefor relative to the deck portion 22 and the wheels 26A, 26B, with the intermediate portions 106A, 106B positioned at least partially on the wheels 26A, 26B, as shown in FIG. 3A. As described above, the first connectors 107A, 107B are used to connect the second ends 105A, 105B to the deck portion 22 at the respective distal preselected locations 108A, 108B on the deck portion 22. Those skilled in the art will appreciate that the specific distal preselected locations 108A, 108B on the deck portion 22 at which the second ends 105A, 105B are thereby attached depends, in each case, on the size and positioning of the wheels 26A, 26B on the deck portion 22 which the straps 33A, 33B are to secure.

To tighten the straps 33A, 33B, the ratchet bodies 32A, 32B are both rotated clockwise, i.e., in the tightening directions indicated by arrows $T_1$ and $T_2$, preferably using the bar 94, as described above. In use, this is preferably done manually by the operator (not shown), grasping the bar at or near its upper ends 98A, 98B (FIG. 10). (It will be understood that only one bar 94 is used, and two bars are shown in FIG. 10 for illustrative purposes only.) Those skilled in the art will appreciate that, preferably, the straps are tightened one at a time. That is, the straps 33A, 33B are pulled, or tightened, when the ratchet bodies are rotated respectively in the clockwise direction, in the direction indicated by arrows "$T_1$" and "$T_2$" in FIG. 3A.

In one embodiment, it is preferred that second connectors 111A, 111B are also used, as follows. Preferably, after the straps 33A, 33B are pulled out, the second ends 105A, 105B are attached to the deck portion 22 at the distal preselected locations 108A 108B respectively. After the intermediate portions 106A, 106B are positioned on the wheels 26A, 26B respectively, the second connectors 111A, 111B preferably are used to connect the straps 33A, 33B, to the deck portion 22 at proximal preselected locations 112A, 112B on the deck portion 22 between the wheel 26A, 26B and the tie-down assembly 20.

As can be seen in FIG. 3A, the second connectors 111A, 111B preferably are used in order to cause the straps 33A, 33B, when tightened, to have respective profiles that generally follow the outer edges of the wheels, except at the lower regions of the wheels. Those skilled in the art will appreciate that this is desirable because, in the absence of the second connector 111A, 111B, the vehicle's body adjacent to the wheels 26A, 26B interferes with, or may interfere with, the straps 33A, 33B as they are being tightened, and/or after it is tightened.

Those skilled in the art will appreciate that the specific proximal preselected locations 112A, 112B at which the connectors 111A, 111B engage or connect with the deck portion 22 depends, in each case, on the size and positionings of the wheels 26A, 26B on the deck portion 22 which the straps 33A, 33B are to secure. Also, those skilled in the art will also appreciate that, in one embodiment, the operator preferably determines positions 114A, 114B (FIG. 3A) on the straps 33A, 33B at which the second connectors 111A, 111B engage (or are secured to) the straps 33A, 33B. That is, in one embodiment, the positions 114A, 114B preferably are determined in view of the proximal preselected locations 112A, 112B respectively. In an alternative embodiment, the second connectors 111A, 111B are secured to the straps 33A, 33B at predetermined positions 114A, 114B thereon.

As can be seen in FIGS. 3A and 3B, the mounting plates 64, 66 preferably include rounded parts 113A, 113B respectively, that are formed to guide or hold the straps 33A, 33B above the deck portion 22, when the straps 33A, 33B are tightened. This is beneficial because, due to the rounded parts 113A, 113B, wear on the straps 33A, 33B is reduced. Preferably, the rounded parts 113A, 113B are configured so that they are substantially flush with the surface of the deck portion 22. This is desirable because it is sought to provide a generally flat surface of the deck portion 22, to facilitate movement of the vehicles on and off the trailer.

As described above, the tightened straps 33A, 33B preferably are released by moving the pawls 40A, 40B from the engaged positions to the disengaged positions respectively. Preferably, the ratchets are released one at a time. It will be understood that such release can cause the ratchet bodies to rotate so rapidly that the operator may be at risk of injury. This risk is minimized in the invention herein because, as illustrated in FIG. 5B and as described above, the bar 94 is used by the operator to move the pawls 40A, 40B respectively to the disengaged position, and also because the ratchets are rotatable in the same direction when tightening the straps, so that the tie-down assembly can be used by the operator from only one location.

As indicated above, in the prior art, the operator can encounter difficulties when attempting to tighten or loosen the straps, due to structural elements (e.g., uprights) of the trailer impeding the operator's actions. From the foregoing, however, it can be seen that, in the tie-down assembly 20 of the invention, the tightening direction is the same for each ratchet subassembly 30A, 30B, and also, the loosening direction is the same for each ratchet subassembly 30A, 30B. This is because the pawl 40A is mounted in an inverted position (FIG. 7), relative to the pawl 40B. The tie-down assembly 20 is therefore advantageous, as the operator can conveniently tighten both ratchets, by rotating the ratchet heads in the same direction, from a location or position that's convenient for the operator. Also, the ratchets are conveniently and safely releaseable by the operator (i.e., using the bar 94, as described above), without requiring the operator to move or change position.

In use, the tie-down assembly preferably is utilized in a method 235 of securing two wheels 26A, 26B of the vehicle 27 (FIG. 1) to the deck portion 22. (For convenience, the wheels are identified as 26A, 26B in FIG. 3A.) In one embodiment, the method 235 includes the steps of, first, providing two straps 33A, 33B, each strap extending between the first and second ends thereof, with intermediate portions 106A, 106B therebetween (step 237, FIG. 15). Also, the tie-down assembly 20 is provided (step 239). Preferably, the tie-down assembly 20 is mounted in the deck portion 22 (step 241). The first end 103A, 103B of each of the straps 33A, 33B is attached to each ratchet body 32A, 32B respectively (step 243). The respective intermediate portions 106A, 106B of each strap 33A, 33B are then positioned on the respective wheels 26A, 26B (step 245). Next, the second ends 105A, 105B of the straps 33A, 33B are attached to the deck portion 22 at the distal preselected locations 108A, 108B thereon selected for locating the intermediate portions 106A, 106B of the straps 33A, 33B on the wheels 26A, 26B (step 247). Next, each ratchet body 32A, 32B is rotated in the predetermined rotary direction (i.e., the tightening direction, indicated by arrows $T_1$, $T_2$ (FIG. 3A)) to tighten the straps 33A, 33B respectively, for securing the respective wheels 26A, 26B to the deck portion 22 (step 249).

Figure 15:
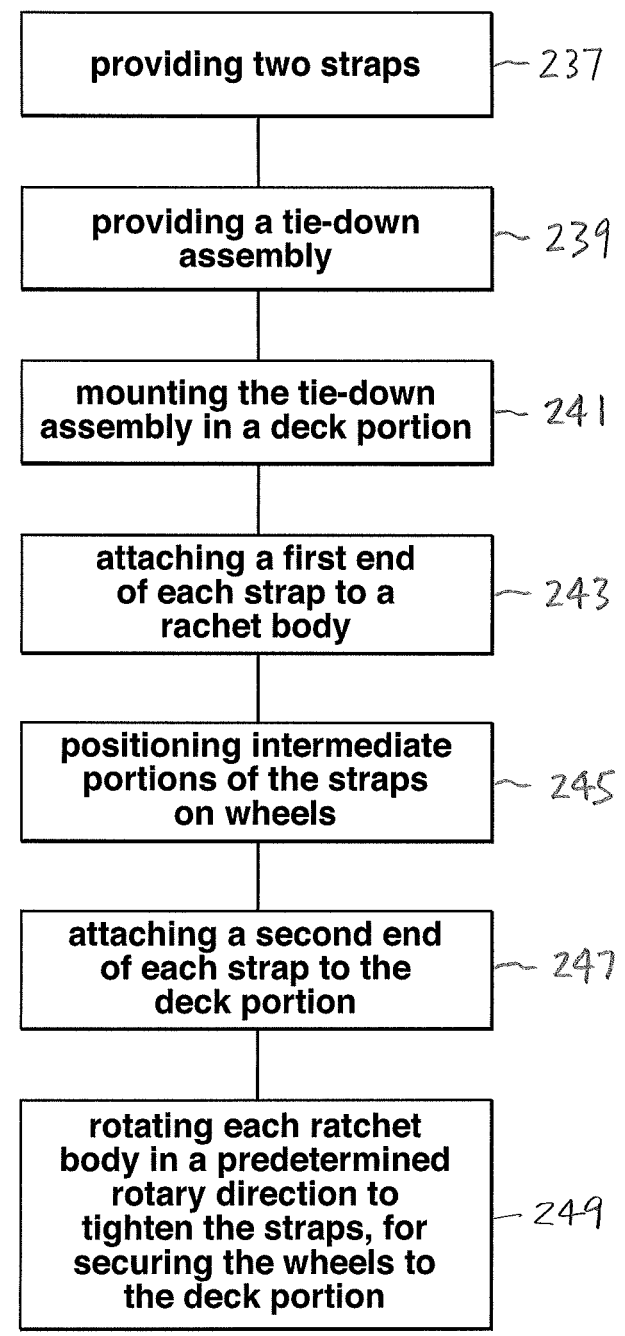
FIG. 15 is a flow chart schematically illustrating an embodiment of a method of the invention.

It will be appreciated by those skilled in the art that, although certain steps are shown in FIG. 15 and described above as preceding certain other steps, the sequence in which certain of these steps are performed is not functionally significant. For example, steps 237 and 239 could take place in any order relative to each other.

As noted above, the method of the invention preferably also includes the step of attaching the second end 105A, 105B of each strap 33A, 33B to the deck portion 22 by using the first connectors 107A, 107B to connect the second ends 105A, 105B to the deck portion 22 at the distal preselected locations 108A, 108B respectively.

Also, and as described above, each of the straps 33A, 33B preferably is connected to the deck portion 22, at the proximal preselected locations 112A, 112B on the deck portion 22 between the wheel on which each strap is located respectively and the tie-down assembly 20 (FIG. 3A). Such connections preferably are effected by the second connector 111A, 111B, which may be in the form of any suitable device. For instance, a J-hook or a double wire hook has been found to be suitable.

Preferably, in order to release the strap, the pawl is moved to the disengaged position. When the pawl is in the disengaged position, the ratchet body is permitted to rotate in the loosening direction, i.e., in the direction opposite to the predetermined (i.e., tightening) rotary direction, for loosening the strap attached to the ratchet body to permit removal thereof from the selected wheel therefor.

Preferably, and as can be seen, for example, in FIG. 2, the invention includes a system 351 for securing two wheels 26A, 26B of the vehicle 27 (FIG. 3A). It will be understood that two such systems preferably are used to secure all four wheels of a vehicle (i.e., an automobile, or a pickup truck), one such system being positioned on each side of the trailer.

In an alternative embodiment of a tie-down assembly 420, the predetermined (i.e., tightening) rotary direction preferably is counter-clockwise, when the tie-down assembly 420 is viewed from the ratchet heads 434A, 434B respectively. The tie-down assembly 420 is illustrated in FIGS. 11-13B. It will be understood that, other than the tightening directions (indicated by arrows "$2T_1$", $2T_2$" in FIGS. 11 and 12) being opposite to those of the assembly 20 (due to different locations of the pawls), the tie-down assembly 420 is the same as the tie-down assembly 20 in all material respects.

Those skilled in the art will appreciate that the advantage of the alternative embodiment 420 is that it can be used where, due to the positioning of uprights 44 on the trailer 42 and also due to the location of the tie-down assembly 420 in the deck portion 22, rotation of the ratchets in the counter-clockwise direction when tightening the straps is preferred.

Figure 11:
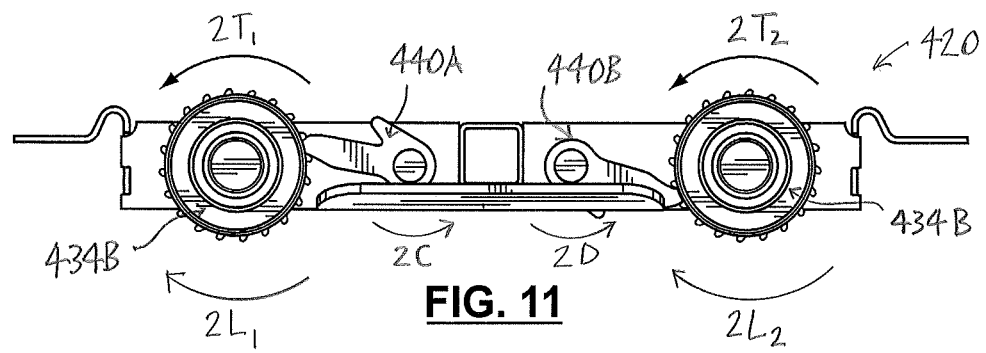
FIG. 11 is a front view of an alternative embodiment of the tie-down assembly of the invention.
Figure 12:
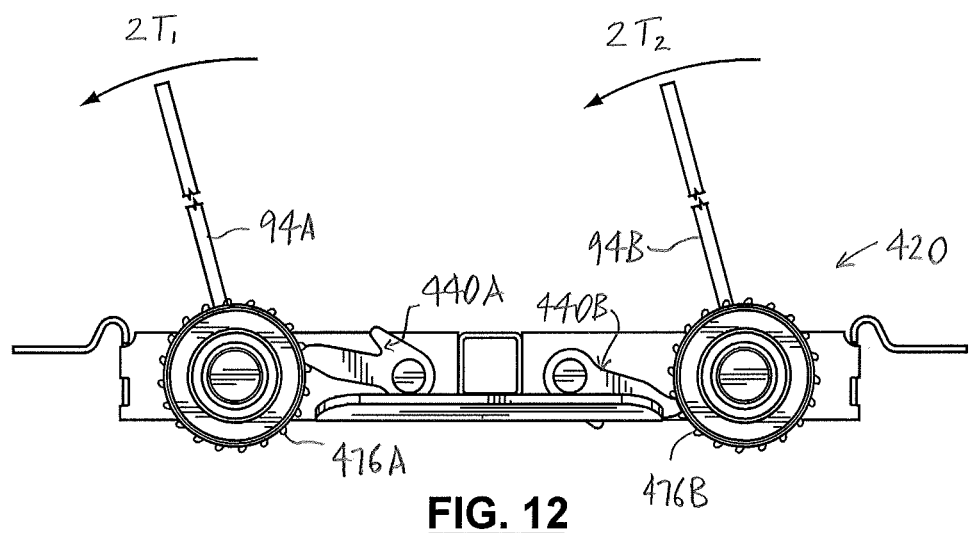
FIG. 12 is a front view of the tie-down assembly of FIG. 11, showing the positions of bars engaged in ratchet heads respectively, for tightening the straps.

As can be seen in FIG. 10, the ratchet heads 434A, 434B are rotated in the counter-clockwise direction (and indicated by arrows "$2T_1$" and "$2T_2$") to cause the ratchet bodies 432A, 432B attached thereto (FIGS. 14A, 14B) to rotate in the same direction, to tighten straps 433A, 433B. In FIGS. 11 and 12, the counter-clockwise rotation of the ratchet heads 434A to tighten the straps 433A, 433B is illustrated. Preferably, to tighten the straps, the bar 94 is used (for a mechanical advantage) when the operator (not shown) is tightening the straps 433A, 433B, as shown in FIG. 12. (It will be understood that the ratchet heads 434A, 434B include holes therein (not shown) in which an end of the bar 94 can be inserted.)

The tie-down assembly 420 preferably includes pawls 440A, 440B that are positioned to permit rotation of the ratchet bodies 432A, 432B (FIG. 13A), as described above. It can be seen that, as compared to the positions of the pawls 40A, 40B in FIG. 10, the positions of the pawls 440A, 440B (shown in FIG. 11) are reversed. The pawls 440A, 440B are positioned and configured to allow the teeth 476A, 476B on the ratchet heads 434A, 434B to slide past the pawls 440A, 440B to permit rotation of the ratchet bodies 432A, 432B in the counter-clockwise direction, to tighten the straps 433A, 433B. However, the pawls 440A, 440B are also positioned and configured to engage the teeth 476A, 476B when the ratchet bodies are rotated clockwise, thereby maintaining the straps 433A, 433B in the tightened condition, once they have been tightened.

As can be seen in FIGS. 13A and 13B, first ends 403A, 403B of the straps 433A, 433B are attached to the ratchet bodies by wrapping parts of the straps 433A, 433B around the ratchet bodies in a suitable manner. To put the straps 433A, 433B on the wheels 26A, 26B, second ends 405A, 405B are pulled out from the tie-down assembly 420, and the ratchet bodies rotate about respective axes $2X_1$, $2X_2$ (FIG. 14A) in the clockwise direction accordingly. Preferably, the second ends 405A, 405B of the straps 433A, 433B are attached to the deck portion 22 at distal preselected locations 408A, 408B by first connectors 407A, 407B.

As schematically illustrated in FIG. 13A, the respective intermediate portions 406A, 406B of the straps 433A, 433B are positioned on the wheels 26A, 26B.

It is also preferred that second connectors 411A, 411B are used to connect the straps 433A, 433B to the deck portion 22 at proximal preselected locations 412A, 412B (FIG. 13A). The second connectors 411A, 411B are attached to the straps 433A, 433B at positions 414A, 414B thereon respectively. Those skilled in the art will appreciate that, in practice, the operator determines the proximal preselected locations 412A, 412B based on the positions of the wheels 26A, 26B on the deck portion 22 and the positions of the wheels 26A, 26B relative to the body (not shown) of the vehicle. In one embodiment, the operator determines the locations 414A, 414B on the straps 433A, 433B at which the second connectors 411A, 411B are attached thereto. In an alternative embodiment, the second connectors 411A, 411B are secured to the straps 433A, 433B at predetermined locations 414A, 414B thereon.

Once the straps 433A, 433B are positioned with second ends attached to the deck portion 22 and the straps 433A, 433B are connected to the deck portion 22 at the proximal preselected locations 412A, 412B, the straps 433A, 433B are tightened (i.e., by rotating the ratchet bodies in the counterclockwise direction), as indicated by the arrows $2T_1$ and $2T_2$. Once the straps 433A, 433B are tightened, they hold the wheels 26A, 26B to the deck portion 22.

It will be understood that the straps 433A, 433B are loosened in the same manner as the straps 33A, 33B connected to the tie-down assembly 20, described above.

The pawls 440A, 440B are each moved separately from the respective engaged positions therefor to the disengaged positions therefor respectively. When this is done to a particular pawl, the ratchet body associated therewith is allowed to rotate in the loosening direction, i.e., in the clockwise direction (FIG. 11). For instance, as shown in FIG. 11, when the pawl 440A is moved to the disengaged position, the ratchet body 432A is permitted to rotate in the clockwise direction (as indicated by arrow "$2L_1$"), loosening the strap 433A. Similarly, when the pawl 440B is moved to the disengaged position, the ratchet body 432B is permitted to rotate in the clockwise direction (as indicated by arrow "$2L_2$").

Figure 14A:
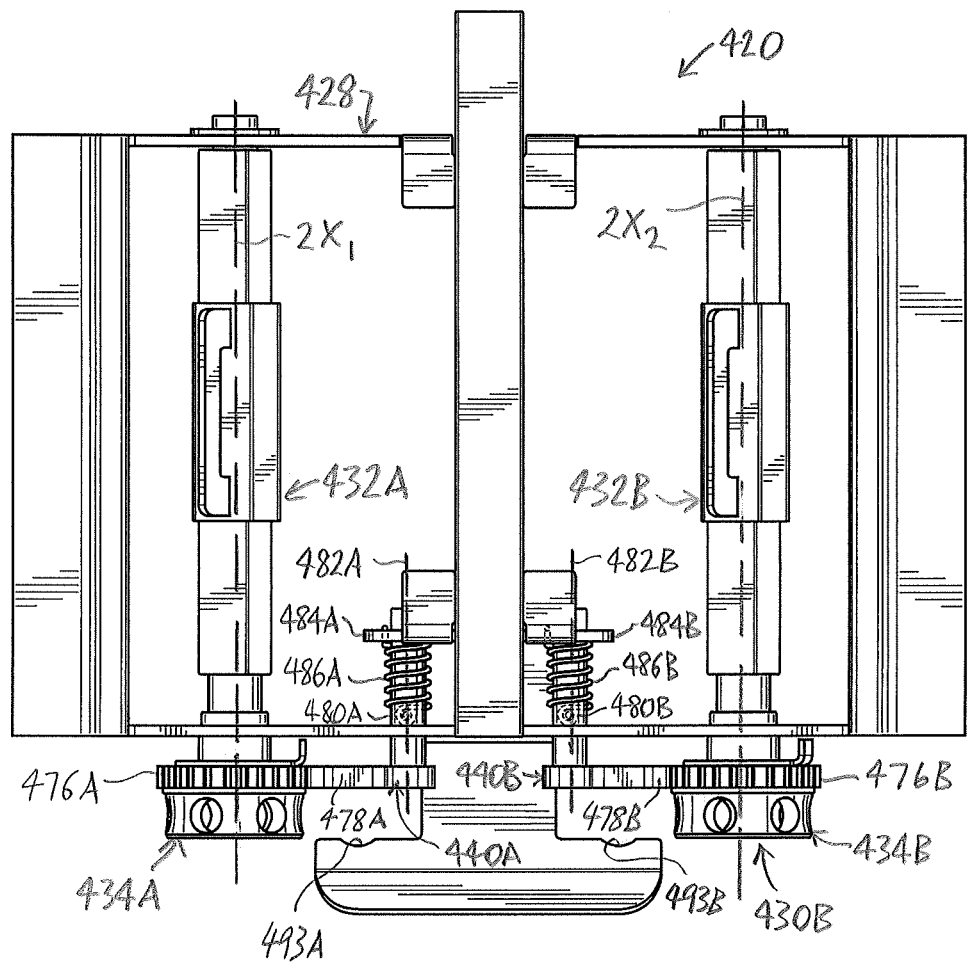
FIG. 14A is a top view of the tie-down assembly of FIG. 11, drawn at a smaller scale.
Figure 14B:
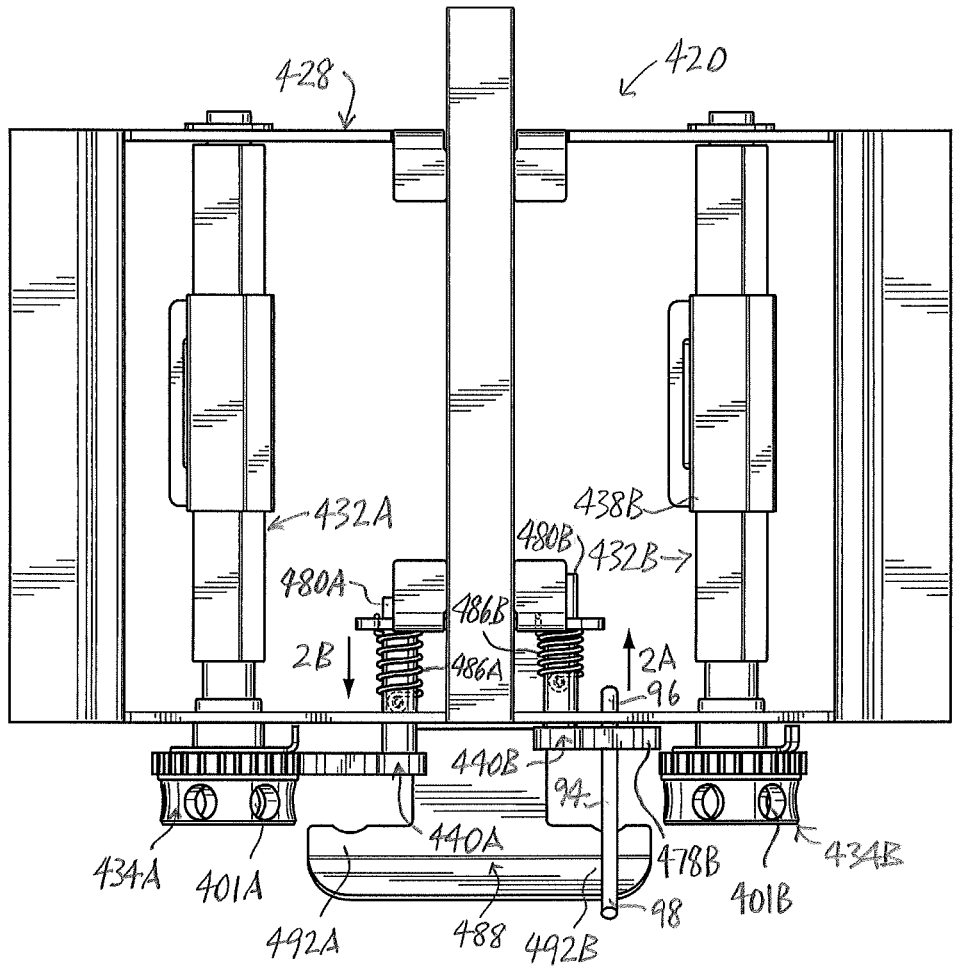
FIG. 14B is a top view of the tie-down assembly of FIG. 14A in which one of the pawls is in a disengaged position.

As can be seen in FIGS. 14A and 14B, the tie-down assembly 420 preferably includes ratchet subassemblies 430A, 430B.

For clarity, only one ratchet subassembly, 430B, will be described in detail herein, it being understood that in almost all material aspects, the ratchet subassemblies 430A, 430B are substantially the same, being virtual mirror images of each other. (The sole material difference is the orientation of engagement portions 478A, 478B of the pawls 440A, 440B relative to the ratchet heads 434A, 434B, as described below.) The pawl 440B preferably includes the engagement portion 478B (FIG. 14A) adapted for engagement with the teeth 476B, as is known in the art. Preferably, and as can be seen in FIG. 14A, the pawl 440B includes a rod 480B rotatable about an axis 482B thereof, and the engagement portion 478B is fixedly mounted on the rod 480B. In one embodiment, the rod 480B extends generally between a support plate 484B and the engagement portion 478B, and is mounted in the support plate 484B and in an outer side 474 of a frame 428 for rotation about the axis 482B. The rod 480B is also adapted for axial movement thereof (i.e., movement of the rod 480B in the directions parallel to the axis 482B, indicated by arrows 2A and 2B in FIG. 14B) relative to the support plate 484B and the outer side 474 of the frame 428. Preferably, a compression spring 486B (i.e., a spring that stores energy when compressed) connects the rod 480B and the support plate 484B, to urge the pawl 440B to the engaged position (FIG. 14A). It can be seen, therefore, that the compression spring 486B biases the pawl 440B to the engaged position.

As can be seen in FIG. 11, both of the pawls 440A, 440B are positioned and configured for engagement with the teeth 476A, 476B, when the pawls 440A, 440B are in the engaged positions thereof From the foregoing description, it will be appreciated that the springs 486A, 486B (FIG. 14A) bias the pawls 440A, 440B to the respective engaged positions therefor, first, by urging both of the pawls 440A, 440B to move linearly in the direction indicated by arrow 2B in FIG. 14A. However, the springs 486A, 486B also act upon the pawls 440A, 440B in a second way, namely, by urging the pawls 440A, 440B respectively to rotate about their respective axes 482A, 482B in the clockwise direction, as indicated by arrows "2C" and "2D" in FIG. 11. Preferably, the pawls 440A, 440B are both urged to rotate in the clockwise direction about the axes 482A, 482B respectively by the springs 486A, 486B (FIG. 14A).

As can be seen in FIG. 11, the pawl 440B is "inverted", i.e., when in the engaged position, the engagement portion 478B engages the ratchet head 434B in a lower quadrant thereof (In contrast, the engagement portion 478A of the pawl 440A engages the ratchet head 434A in a "normal" position, i.e., in an upper quadrant thereof) It can be seen, therefore, that the springs 486A, 486B act upon each of the pawls 440A, 440B respectively in two different ways. The springs 486A, 486B urge the pawls 440A, 440B to move linearly, i.e., in the direction indicated by arrow "2B", and the springs 486A, 486B also (and simultaneously) urge the pawls 440A and 440B to rotate about the axes 482A, 482B (in the directions indicated by arrows 2C and 2D (FIG. 11). It will be understood that the springs 486A, 486B preferably are each secured, at inner ends thereof, to the support plates 484A, 484B, and also that they are secured at outer ends thereof to the rods 480A, 480B respectively, in substantially the same manner as described above with reference to FIG. 6.

In FIG. 14B, the pawl 440B is shown in the disengaged position, and the pawl 440A is shown in the engaged position. (To simplify the drawings, in both FIGS. 14A and 14B, the pawl 440A is shown in the engaged position. However, from the foregoing description, it will be understood that the pawl 440A is movable between the engaged and the disengaged positions.)

In one embodiment, the frame 428 preferably also includes a base plate 488 mounted to the outer side 474 (FIG. 14B). Preferably, the base plate 488 includes a central portion 490 and locating parts 492A, 492B extending from the central portion 490 in opposite directions generally parallel to the engagement portions 478A, 478B of the pawls 440A, 440B (FIG. 14B). The locating parts 492A, 492B preferably are spaced apart from the engagement portions 478A, 478B respectively. Preferably, the locating parts 492A, 492B include bights or slots 493A, 493B (FIG. 14A).

As can be seen in FIGS. 14A and 14B, to move the pawl 440B from the engaged position (FIG. 14A) to the disengaged position (FIG. 14B), a bar 94 preferably is partially inserted between the engagement portion 478B and the locating part 492A. A lower end 496 of the bar 94 preferably is positioned below the engagement portion 478B, with an upper end 498 of the bar extending upwardly and away from the engagement portion 478B (FIG. 14B). Preferably, the bar 94 engages the locating part 492B at the slot 493B, which locates the bar 94 relative to the engagement portion 478B. It can be seen in FIG. 14B that the locating part 492B preferably is used as a fulcrum, and the bar 94 is used as a lever to pry the pawl 440B inwardly, i.e., in the direction indicated by arrow 2A in FIG.

14B. While engaging the engagement portion 478B, the bar 94 is pushed against the engagement portion 478B (i.e., when the upper end 498 is subjected to downwardly and outwardly directed pressure) to overcome the resistance of the spring 486B and, as a result, to move the engagement portion 478B from the engaged position (FIG. 14A) to the disengaged position thereof (FIG. 14B).

In summary, it is preferred that each of the pawls 440A, 440B is movable from the engaged position to the disengaged position by engaging the engagement portion 478A, 478B of the pawls 440A, 440B with the bar 94 positioned between the engagement portion 478A, 478B and the locating part 492A, 492B to lever or pry the pawl 440A, 440B to the disengaged position. It will be understood that the springs 486A, 486B preferably are attached to the rods 480A, 480B and the support plates 484A, 484B respectively in the same way as the springs 86A, 86B are attached to corresponding elements in the tie-down assembly 20, as described above. However, those skilled in the art will appreciate that various types of springs may be attached in various arrangements.

In one embodiment, each ratchet head 434A, 434B preferably includes apertures 401A, 401B (FIGS. 14A, 14B) in which an end (not shown) of the bar 94 is receivable. The apertures 401A, 401B are to facilitate tightening the straps 433A, 433B, i.e., to facilitate rotating the ratchet head 434A, 434B in the tightening direction. Bars (identified in FIG. 12 as 94A and 94B for convenience) are positioned partially in the apertures 401A, 401B, to enable the operator to tighten the straps 433A, 433B. (It will be understood that, in practice, the operator would use only one bar at a time, and tighten each strap serially.) For example, as can be seen in FIG. 12, to turn the ratchet head 434B in the tightening direction, the bar's end is positioned in a selected one of the apertures 401B, and the operator (not shown) moves the bar 94 in the tightening direction, thereby causing the ratchet head 434B to turn in the tightening direction, to tighten the strap connected to the collar 438B. Similarly, and as shown in FIG. 12, the bar 94 is inserted into a selected one of the apertures 401A in the ratchet head 434A, and the bar 94 is moved in the tightening direction (indicated by arrow $2T_1$), to tighten the strap 433A. The same process is followed, with the end of the bar 94 positioned in one of the holes 401B as desired, to tighten the strap 433B.

It will be appreciated by those skilled in the art that, in normal operation, two straps preferably are attached to the tie-down assembly, i.e., the straps extending outwardly from the tie-down assembly 420 in opposite directions, as can be seen in FIG. 13A. It will be understood that the process to be followed to position the straps 433A, 433B on the wheels 26A, 26B and tightened and loosened in substantially the same way as the straps 33A, 33B are tightened and loosened, as described.

It will also be appreciated by those skilled in the art that the invention can take many forms, and that such forms are within the scope of the invention as described above. The foregoing descriptions are exemplary. The scope of the claims should not be limited by the preferred embodiments set forth in the examples, but should be given the broadest interpretation consistent with the description as a whole.

I claim:

1. A tie-down assembly to be mounted in a deck portion to secure an object to the deck portion, the tie-down assembly comprising:
    a frame;
    a pair of ratchet subassemblies, each said ratchet subassembly comprising:
        an elongate ratchet body to which a selected one of two straps is attachable;
        a ratchet head secured to the ratchet body, the ratchet head and the ratchet body being coaxial relative to an axis thereof;
    each of the ratchet bodies being mounted in the frame to permit rotation thereof about the axis thereof respectively in a predetermined rotary direction to tighten the selected one of the straps attached thereto, for securing the object to the deck portion;
    each ratchet subassembly additionally comprising a pawl, for preventing rotation of the ratchet head engageable therewith about the axis thereof in a direction opposite to the predetermined rotary direction; and
    each of the ratchet bodies being rotatable in the same predetermined rotary direction to tighten the selected one of the straps attached thereto respectively;
    in each ratchet subassembly, the pawl being movable between:
        an engaged position, in which the pawl engages the ratchet head to prevent rotation thereof in the direction opposite to the predetermined rotary direction, and in which the pawl permits rotation of the ratchet head in the predetermined rotary direction;
        a disengaged position, in which the pawl is disengaged from the ratchet head to permit rotation thereof in the direction opposite to the predetermined rotary direction, for loosening the selected one of the straps attached to the ratchet body to which the ratchet head is secured;
    the pawl being urged to rotate at least partially upwardly to the engaged position; and
    the pawl being movable from the engaged position to the disengaged position by engaging an engagement portion of the pawl with a bar positioned between the engagement portion and a locating part of the tie-down assembly, to lever the pawl to the disengaged position.

* * * * *